Dec. 29, 1931.  E. L. FICKETT ET AL  1,838,816
MILLING MACHINE FOR LOCOMOTIVE DRIVING BOXES
Filed Dec. 2, 1929  3 Sheets-Sheet 1
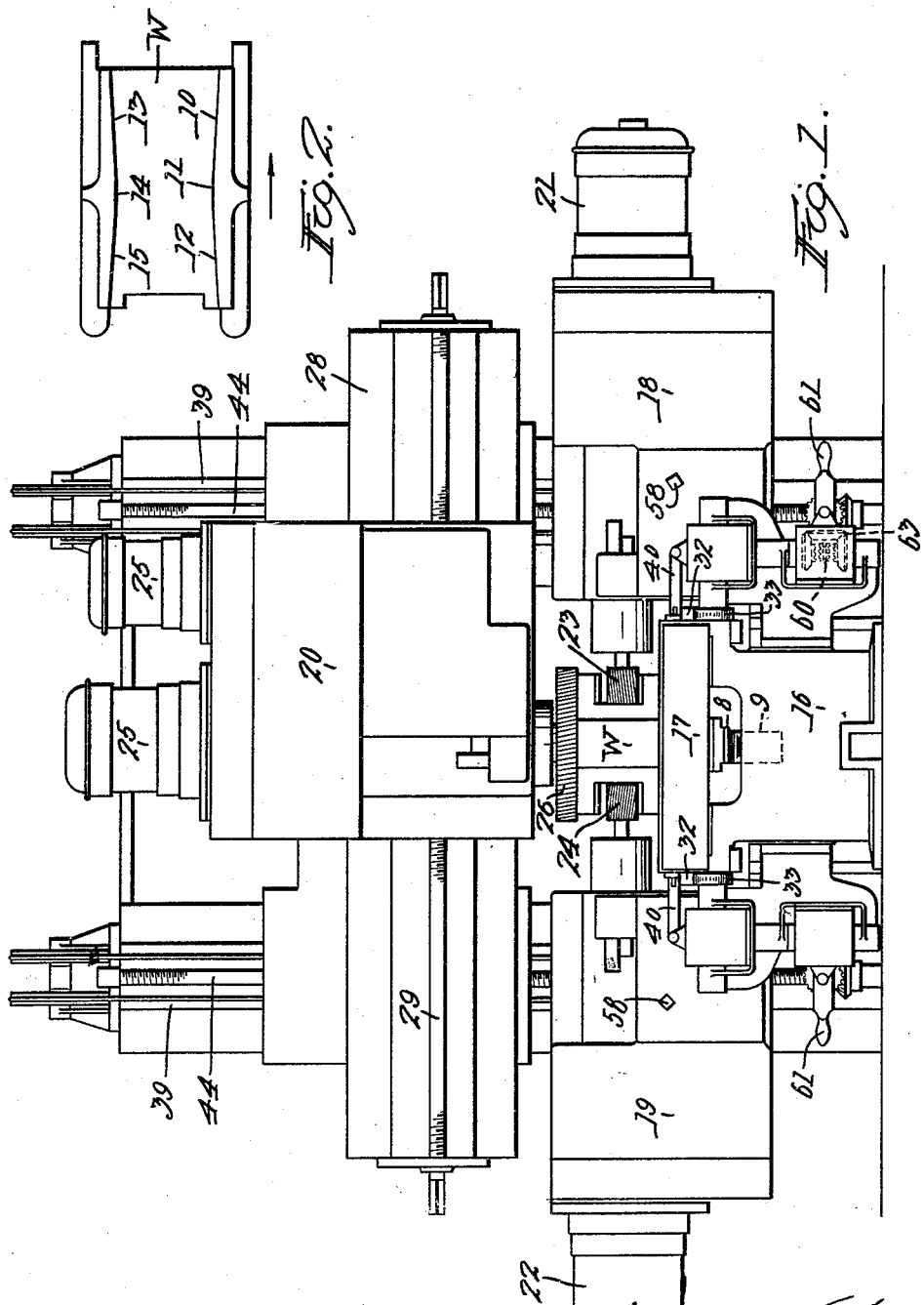
Inventors
Ernest L. Fickett
Roderick P. Stocking
By Attorneys
Southgate Fay & Hanley Dec. 29, 1931.  E. L. FICKETT ET AL  1,838,816
MILLING MACHINE FOR LOCOMOTIVE DRIVING BOXES
Filed Dec. 2, 1929  3 Sheets-Sheet 2
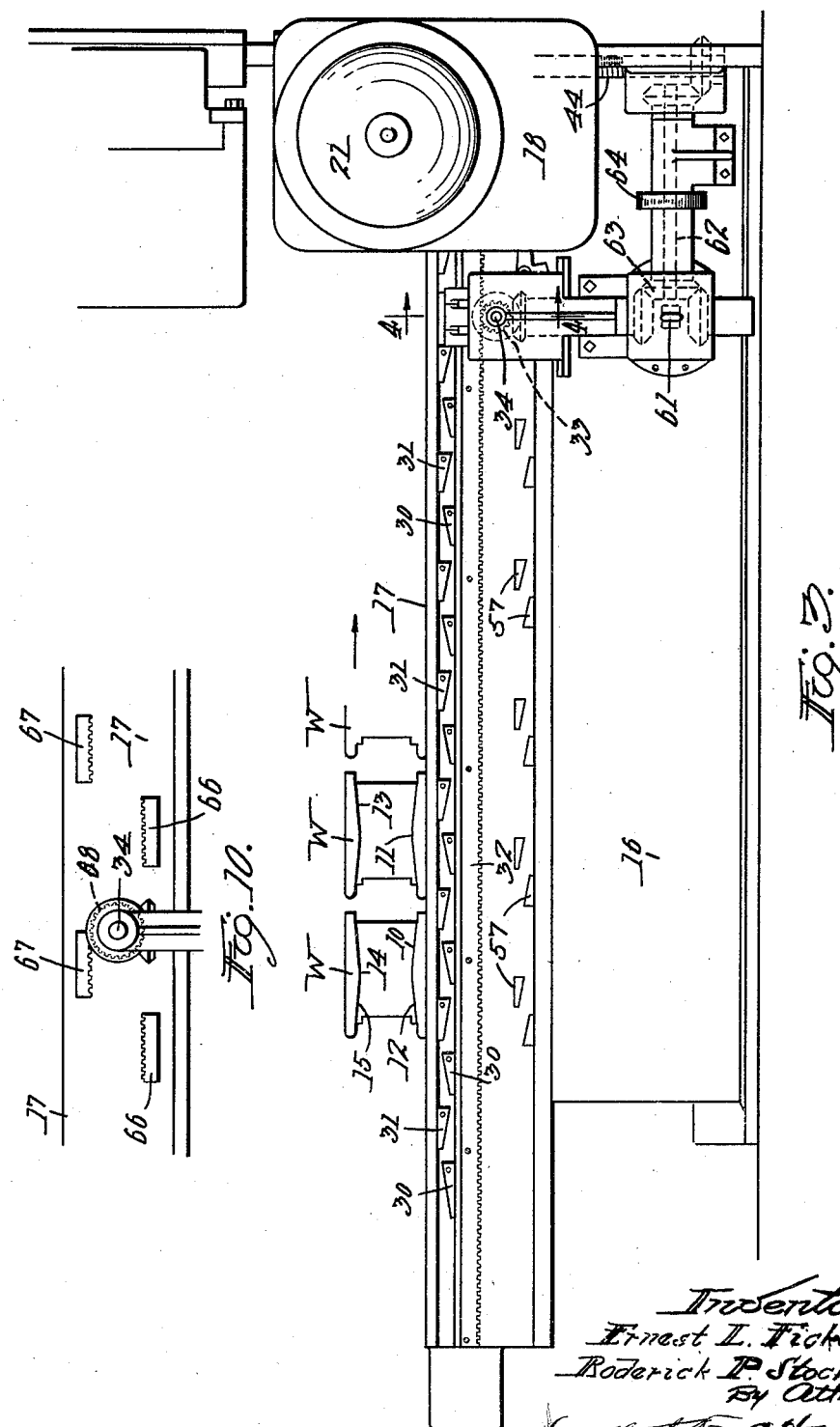

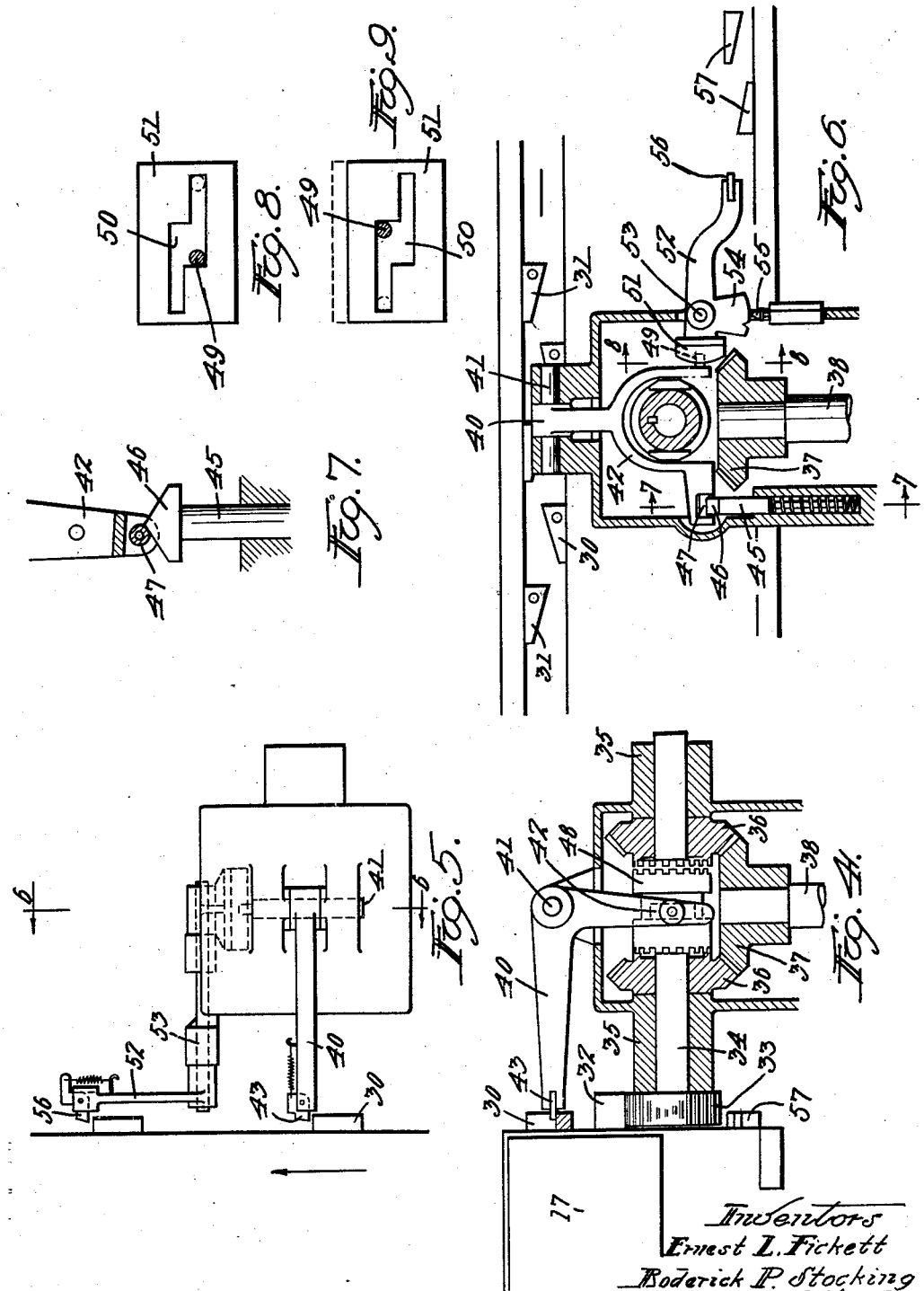

Patented Dec. 29, 1931

1,838,816

UNITED STATES PATENT OFFICE

ERNEST L. FICKETT AND RODERICK P. STOCKING, OF FITCHBURG, MASSACHUSETTS, ASSIGNORS TO MANNING, MAXWELL & MOORE, INC., OF NEW YORK, N. Y., A CORPORATION OF NEW JERSEY

MILLING MACHINE FOR LOCOMOTIVE DRIVING BOXES

Application filed December 2, 1929. Serial No. 410,910.

This invention relates to a machine for milling the tapered and straight cuts on the opposite sides of a locomotive driving box.

The principal objects of the invention are to provide a simple and accurate means for performing the operation of milling up an incline, then across the horizontal surface and down the incline on the other side of the taper in which the work is moved along on a table and the cutter is moved vertically during this operation to finish the inclined surfaces; to provide novel means for producing this feed of the cutter and produce the changes automatically, so that the two inclined surfaces and the horizontal surfaces are finished in one movement of the work supporting table; to provide for controlling this feed by dogs on the table of the machine; to provide means whereby the table can be moved back after the cutting operations without causing these dogs to change the height of the cutter; to provide means for automatically holding the clutch in neutral position to avoid feeding the cutter while finishing the horizontal surface; to provide automatic means for thereafter throwing the clutch in to feed the cutter vertically on the last one of the three cuts; to provide a device in which the table can be moved past the cutters to produce the straight and tapered milling on the top side of the box, and to provide improvements in these various features of the machine.

Other objects and advantages of the invention will appear hereinafter.

Reference is to be had to the accompanying drawings in which

Fig. 1 is a front elevation of the entire machine;

Fig. 2 is a side elevation of one of the locomotive driving boxes, which constitutes the work for which this machine is especially designed;

Fig. 3 is a side view of the machine with the cutters and upper parts removed;

Fig. 4 is a sectional view through the reversing mechanism, taken on the line 4—4 in Fig. 3;

Fig. 5 is a plan view of the means operated by the dogs for controlling the clutch;

Fig. 6 is a sectional view on the line 6—6 of Fig. 5 showing the operation of the clutch;

Fig. 7 is a sectional view on the line 7—7 of Fig. 6;

Fig. 8 is a side view on the line 8—8 of Fig. 6, showing the end of the latching device;

Fig. 9 is a similar view, showing the parts in a different position, and

Fig. 10 is a side view of a part of a machine showing a modified means for accomplishing the same object.

This machine, although capable of performing finishing operations on machine parts in which it is desired to cut a slant or even a curved surface, in combination with other surfaces, is particularly designed for the milling of the straight and tapering cuts on the sides of a locomotive driving box and for milling them on both sides at the same time, and for being adjusted so as to mill the cuts at the top of the box as well as those on the bottom. The side of such a driving box is indicated in Fig. 2. The machine is designed to form the slanting cut 10, the horizontal cut 11 and the opposite slanting cut 12 in one pass of the work through the machine. It is also designed to form the corresponding cut 13, 14 and 15 at the top by passing the work through the machine again.

The machine comprises a bed 16 and a reciprocating table 17. This may be constructed like an ordinary planer table and is driven in the same way by a gear 9 and rack 8. On this table the work W is mounted. The machine is provided with a series of unit milling heads 18, 19 and 20. The tool spindles of the horizontal heads 18 and 19 are operated by motors 21 and 22. The milling cutters 23 and 24 are shown in Fig. 1 as in the act of cutting the two surfaces 11 on the work. The vertical head 20 is shown as operated by two motors 25 one of which drives a cutter 26 for finishing off the flat top surface of the driving box during the single pass of the same through the machine on the table 17. The other motor 25 traverses the head 20.

These heads are not described in detail, as any unit milling head can be employed in which there is a motor on each head for operating the milling cutter therefor. The side heads 18 and 19 are mounted on vertical ways 39 on the opposite sides of the machine and by means of screws 44 and nuts on the heads they can be moved up and down these ways. The head 20 is mounted on horizontal ways 28 and this is provided with a horizontal screw 29 along which the head is operated to finish the entire top surface of the driving box in a plane. This motion is obtained from one motor 25 while the other is geared down to rotate the two tools.

In this way the several milling tools 23, 24 and 26 are manipulated to perform the desired objects. The latter milling tool is not raised or lowered during the operation and its bottom surface cuts. The heads 18 and 19 are arranged to move vertically when required, so that by their combined vertical movement and the horizontal movement of the driving box W, carried by the movable table 17, inclined surfaces can be milled.

The table 17 of the machine is provided with two series of slanting dogs 30 and 31. Carried on the table 17 is a rack 32 on each side, meshing with gears 33 mounted on shafts 34 located in stationary bearings 35 on each side of the machine. On the shaft 34 is a clutch 48 which is connected with bevel gears 36 driving a bevel gear 37 in either direction, according to the position of the clutch, and thus driving a shaft 38 forward or back or leaving it stationary, as may be desired.

For the purpose of operating this clutch, a clutch fork 40 is employed pivoted on a stud 41. This clutch fork has a yoke 42 for engaging in a groove around the clutch and operating it. This groove is wider than the part of the fork that engages it, to allow for lost motion. The clutch fork is provided with a swiveled pawl 43 which is provided with a spring and engages the dog 30 to raise that end of the fork when passing across in the cutting direction. When passing in the rearward direction the pawl 43 yields and no action takes place. When the pawl 43 engages a dog and rides up the incline, the fork 42 will be moved in one direction and cause the shaft 34 to rotate one of the gears 36 and turn the shaft 38 in one direction. This, as will be explained later, raises the head 18 and the same action is being performed on the other side to raise the head 19. Thus the inclined surface 10 is milled.

Now when the pawl reaches the top of this dog 30 it passes out of the control of this dog. As there is nothing to hold it up, means is provided for holding the clutch in neutral position at this time and the planer table passes along the space between the two of these dogs 31 with the two cutters 23 and 24 left in the position in which the dog has placed them. This distance is represented by the space between the two dogs and the cut 11 is performed horizontally during that period.

Now the pawl 43 engages the next dog 31 and is forced to move down again while the table is going forward, thus producing the cut 12. If several pieces of work are located on the table the process is repeated over and over but between the two pieces of work the cutter is held stationary as far as vertical position is concerned while passing from one piece of work to the other and starts on the second piece at the elevation of which it completed the first, etc.

The machine is provided with a spring plunger 45 having a double inclined or conical head 46 for engaging a roll 47 carried by the clutch fork 42. When the clutch is shifted, this will tend to hold it in either extreme position as will be obvious but not in neutral position.

The fork 42 is provided with a pin 49 on the opposite side which is adapted to engage in a double slot 50 in a latch plate 51. Normally the pin moves back and forth in one straight part of the slot. This latch plate is mounted on a lever 52 which is adapted to swing on a pivot stud 53 on which it is supported. It is provided with a notched plate 54 and a spring plunger 55 to hold it in either extreme position. It is also provided with a spring pawl 56 arranged just like the pawl 43 and operated by a series of slanting dogs 57 fixed on the table of the machine.

When the pawl 56 rides on one of the dogs 57, when the clutch 48 is in neutral position, the lever 52 is raised and swings the latch plate 51, causing the pin 49 to move up into the upper part of the slot 50. When this pin 49 is in the upper part of the slot 50, it holds the clutch 48 positively in neutral position, thus preventing the feeding of the head 18 or 19 vertically. It is held in this position while the cut 11 is made and also while the table is passing the cutters between two of the pieces of work.

In going through once, the three cuts 10, 11 and 12 are made on the several pieces of work. The last dog 30 is wider than the others so as to move the cutter out of the way of the surfaces 11 for the back stroke. Then the table reverses automatically in the usual way, the mechanism not being shown, and moves back, the heads 18 and 19 being raised by the last dog on the bed so that the cutters can move between the surface 11 and the upper surface 14. When the table reaches the opposite end of its back stroke it stops and the heads 18 and 19 can then be adjusted by squared shafts 58 on the heads so that on the forward stroke, the same cutters 23 and 24 will cut the surfaces 15, 14 and 13 in the same way, controlled by the same dogs 30 and 31.

The turning of each shaft 38 in opposite directions results, by means of a hand-operated clutch 60 connected with a handle 61, in turning a shaft 62 in either direction through the clutch and bevel gears 63. This shaft, by spur gears 64 and bevel gears, turns the screw 44 which is connected with a head 18 to raise and lower it in accordance with the direction of rotation. This is for the purpose of raising the head, and at the same time the head 19 on the other side, so as to cut on the under surfaces 15, 14 and 13 on the second stroke forward of the table and take these cuts in a direction the same as that of the first pass of the table.

The operation in this case is the same as has been described, the same dogs 30 and 31 being the controlling means for the cutters but as the cut is the other side up, the shaft 44 has to be reversed as stated by the turning of the handles 61.

Other ways of carrying out the invention can be employed and in Fig. 10 we have indicated diagrammatically, one way in which, in place of the dogs, small racks 66 and 67 are used, operating on a gear 68 which is carried by the shaft 34. No further description of this form is thought to be necessary as it will be seen that the gear 68 is turned in one direction as the table 17 passes from one of the racks 66, then is left stationary and then engages the rack 67 and is turned in the opposite direction, the result being the same as in the dog construction shown in the other figures.

In this way it will be seen that the upper and lower, slanting and horizontal surfaces on the locomotive driving boxes can be milled by two passes between the table and, by having the cutters on both sides, the two sides of the boxes are milled at the same time.

It will also be seen that the invention, although shown as adapted for this particular piece of work can be used for various other kinds of work in which there are slanting and horizontal surfaces to be milled and that it is not limited to this particular operation.

Although we have illustrated and described only two forms of the invention we are aware of the fact that other modifications can be made therein by any person skilled in the art without departing from the scope of the invention as expressed in the claims. Therefore we do not wish to be limited in this respect but what we do claim is:—

1. In a milling machine, the combination with a reciprocable table for carrying a plurality of pieces of work, of a rotary milling cutter mounted on an axis parallel with the surface of the table for finishing the work, a series of devices secured to the table and movable therewith, a rack along the side of the table, a gear meshing with said rack, means operated by said gear for moving the cutter toward and from the table as the gear rotates, and means operated by said devices for reversing the direction of movement of the cutter bodily so as to cause the cutter to move toward the table at times and from it other times while the table is moving along uninterruptedly.

2. In a machine tool, the combination with a reciprocable table for carrying the work, of a cutter over the table, a rack carried by the table, a gear meshing with the rack, a screw, means connected with the gear for rotating the screw, means for changing the direction of rotation of the screw by the gear continuously turning in the same direction, dogs located on the table, means operated by said dogs for throwing the reversing means in either direction to change the direction of rotation of the screw, and means connected with the screw for raising and lowering the cutter according to the direction of rotation of the screw.

3. In a milling machine, the combination with a reciprocable table for carrying the work, of a milling cutter over the table, a rack carried by the table, a gear meshing with the rack, a screw, means connected with the gear for rotating the screw, means for changing the direction of rotation of the screw by the gear set continuously to turn in the same direction, the reversing means including a clutch, dogs located on the table, means operated by said dogs for throwing the clutch in either direction to change the direction of rotation of the screw, means connected with the screw for raising and lowering the milling cutter according to the direction of rotation of the screw, and yielding means for holding the clutch in either extreme position.

4. In a milling machine, the combination with a reciprocable table for carrying the work, of a milling cutter over the table, a rack carried by the table, a gear meshing with the rack, a screw, means connected with the gear for rotating the screw, means comprising a clutch for changing the direction of rotation of the screw by the gear set continuously to turn in the same direction, dogs located on the table, means operated by said dogs for throwing the clutch in either direction to change the direction of rotation of the screw, means connected with the screw for raising and lowering the milling cutter according to the direction of rotation of the screw, and means conected with the clutch operating means for locking the clutch in neutral position each time it comes into that position, so that a horizontal cut can be made by the milling cutter, or the cutter can pass from one piece of work to the next without changing its elevation.

5. In a milling machine, the combination with a reciprocable table for supporting a plurality of pieces of work, of a rotary cutter over the table, a rack carried by the table, a gear constantly meshing with said rack and rotatable by the movement of the table, a shaft on which the gear is located, reversing means comprising a clutch on the shaft, a second shaft connected to be operated by the first shaft in either direction according to the position of the clutch, a clutch yoke for operating the clutch, a series of dogs adjustably fixed on the table for operating the clutch yoke to turn the second shaft from the gear in either direction or hold it neutral, means whereby, when the clutch is in neutral position, the clutch will be locked in neutral position, and means operated by the second shaft for raising or lowering the cutting tool whenever said second shaft turns.

6. In a milling machine, the combination with a reciprocable table for supporting a plurality of pieces of work, of a rotary cutter over the table, a rack carried by the table, a gear constantly meshing with said rack and rotatable by the movement of the table, a shaft on which the gear is located, reversing means comprising a clutch on the shaft, a second shaft connected to be operated by the first shaft in either direction according to the position of the clutch, a clutch yoke for operating the clutch, a series of dogs adjustably fixed on the table for operating the clutch yoke to turn the second shaft from the gear in either direction or hold it neutral, said clutch yoke having a pin thereon, a lever having a head provided with a cross-shaped slot for receiving said pin, a series of dogs fixed in stationary position on the table of the machine for engaging said lever and when the clutch is in neutral position moving the lever to bring the pin into a part of the slot to prevent vertical motion, whereby the clutch cannot be moved out of neutral position, and means operated by the second shaft for raising or lowering the cutting tool whenever said second shaft turns.

7. In a milling machine, the combination with a reciprocable table for supporting work, of a rotary cutter over the table, a rack carried by the table, a gear constantly meshing with said rack and rotatable by the movement of the table, a shaft on which the gear is located, a clutch on the shaft, reversing means comprising a clutch yoke for operating the clutch, said clutch yoke having a pin thereon, a lever having a head provided with a T-shaped slot for receiving said pin, dogs for engaging said lever and when the clutch is in neutral position moving the lever to bring the pin into a part of the slot to prevent vertical motion, whereby the clutch cannot be moved out of neutral position, and means operated by the shaft for raising or lowering the cutting tool.

8. In a milling machine, the combination with a reciprocable table for holding a series of pieces of work, of a milling cutter mounted on an axis parallel with the plane of the table and adapted to cut on the upper surface of the work, and also on the bottom or an overhanging surface of the work, means for moving the cutter toward and from the table in contact with said upper surface of the work as the table moves forward to finish said upper surfaces, some of them in inclined position, means whereby, as the table moves back, the cutter will be placed out of contact with the work, means for moving the cutter by hand when the table is moved back to move it into contact with the underside of said overhanging surfaces, and means whereby the cutter will be controlled on the next forward stroke of the table by the same mechanism for cutting the under surfaces of said pieces of work, some in inclined position.

9. In a milling machine, the combination with a reciprocable table for supporting the work, of a pair of milling cutters located over the work on horizontal shafts and at the same elevation, whereby they will make the same cuts on opposite sides of the work, a pair of racks on the opposite sides of said table movable therewith, a pair of gears meshing with the racks, a pair of screws by which the two cutters can be raised and lowered, means connected with said gears for rotating the screws either to raise or lower the cutters by the continuous operation of said gears, and means on the opposite sides of the table for controlling the rotation of the screws from the gears.

10. In a machine tool, the combination with a reciprocable table for supporting the work, of a pair of rotary tools located over the work on opposite sides thereof, a pair of racks on the opposite sides of said table movable therewith, a pair of gears meshing with the racks, a pair of screws by which the two tools can be raised and lowered, means connected with said gears for rotating the screws by the continuous operation of said gears, and hand operated means on the opposite sides of the table for reversing the rotation of the screws from the gears.

11. In a milling machine, the combination with a reciprocable table for supporting the work, two opposite milling units carried by the machine on opposite sides of said table, a pair of vertical screws for raising and lowering said milling units, each of said milling units having a shaft and a milling cutter thereon for milling surfaces on opposite sides of the work, of means operated by the reciprocation of the table for turning the screws, and means controlled by the motion of the table for reversing the rotation of the screws, whereby said cutters will be controlled to move up or down and mill inclined surfaces on the work.

12. In a milling machine, the combination with a reciprocable table for supporting the work, two opposite milling units carried by the machine on opposite sides of said table, a pair of vertical screws for raising and lowering said milling units, each of said milling units having a shaft and a milling cutter thereon for milling surfaces on opposite sides of the work, of means operated by the reciprocation of the table for turning the screws, means controlled by the motion of the table for reversing the rotation of the screws, whereby said cutters will be controlled to move up or down and mill inclined surfaces on the work, a cross rail on the machine having a horizontal screw, and a third head carried by said cross rail and operated by said horizontal screw and having a milling cutter for milling off the plain surfaces on the top of the work as the table moves under it.

13. In a milling machine, the combination with a reciprocable table for supporting the work, two opposed milling units carried by the machine on opposite sides of said table, a pair of vertical screws for raising and lowering said milling units, each of said milling units having a shaft and a milling cutter thereon for milling surfaces on opposite sides of the work, of means operated by the reciprocation of the table for turning the screws, whereby said cutters will be controlled to mill inclined surfaces on the work.

14. In a machine tool, the combination with a reciprocable table for supporting the work, of a pair of rotary tools located over the work on opposite sides thereof, a pair of racks on the opposite sides of said table movable therewith, a pair of gears meshing with the racks, a pair of screws by which the two tools can be raised and lowered, and means connected with said gears for rotating the screws by the continuous operation of said gears.

In testimony whereof we have hereunto affixed our signatures.

ERNEST L. FICKETT.
RODERICK P. STOCKING.